United States Patent [19]
Fowler

[11] 3,734,034
[45] May 22, 1973

[54] KINDLING APPARATUS

[76] Inventor: Oliver E. Fowler, 520 Camellia Drive, Lafayette, La. 70501

[22] Filed: Sept. 7, 1971

[21] Appl. No.: 176,344

[52] U.S. Cl. .................................. 110/1 F, 126/25 B
[51] Int. Cl. ............................................. F23q 13/00
[58] Field of Search ...................... 110/1 F; 126/25 B

[56] References Cited

UNITED STATES PATENTS

| | | | |
|---|---|---|---|
| 3,499,399 | 3/1970 | Kaufman | 110/1 F |
| 859,030 | 7/1907 | Walker et al | 126/25 B |
| 3,296,984 | 1/1967 | Durfee | 126/25 B |
| 2,939,773 | 6/1960 | Rymer | 126/25 B |
| 3,590,755 | 7/1971 | Niemann | 110/1 F |

*Primary Examiner*—Kenneth W. Sprague
*Attorney*—Pravel, Wilson & Matthews

[57] ABSTRACT

A new and improved apparatus for kindling charcoal with a very small fire including a removable handle for dumping kindled charcoal into a grill or brazier.

9 Claims, 3 Drawing Figures

PATENTED MAY 22 1973 3,734,034

KINDLING APPARATUS

BACKGROUND OF THE INVENTION

1. Field of the Invention

The field of this invention is apparatus for kindling a fuel such as charcoal.

2. Description of Prior Art

Charcoal briquettes are a very popular fuel for outdoor cooking. It is most often necessary to kindle at least a portion of such charcoal briquettes to a glowing red hot before the charcoal briquettes radiate sufficient heat to sustain a cooking temperature for the length of time necessary to cook food.

Various means have been devised for kindling such briquettes after they have been dumped in a grill, brazier, or pit. One very common means is to pour a flammable liquid over the charcoal briquettes and to then ignite the liquid with a match, which causes the flammable liquid to burst into flame immediately. Flammable liquids are not completely satisfactory because the amount of flame is dependent on the amount of flammable liquid poured over the charcoal briquettes, which is not readily measurable. If too much flammable liquid is poured over the charcoal briquettes, the fire may be too high and thus harmful to persons or objects nearby. If too little flammable liquid is initially poured over the charcoal briquettes, the briquettes may not be sufficiently kindled for cooking by the initial burning. When this occurs, there arises a great but dangerous temptation to pour more flammable liquid over the partially kindled charcoal briquettes to start the briquettes flaming again. Pouring more flammable liquid on a partially kindled fire is extremely dangerous since it is possible that the fumes may ignite the liquid container in the hands of the user.

Electric starters have been devised for kindling the charcoal briquettes, but such starters are quite slow and not entirely practical since an electrical outlet is not always convenient to the outdoor grill.

Various kindling devices such as the devices disclosed in the U. S. Pat. Nos. 3,499,399 and 3,307,506 have been designed for kindling the charcoal briquettes prior to dumping the briquettes in the grill. Such kindling devices generally include some type of open-ended housing with a grate therein to support the charcoal briquettes. One disadvantage to such devices is that they are quite difficult to handle since the housing becomes very hot from the kindling fire.

SUMMARY OF THE INVENTION

It is an object of this invention to provide a new and improved apparatus for kindling charcoal or similar fuels.

This and other objects is accomplished by an apparatus which includes a rectangular shaped housing having a grate therein for supporting a few sheets of newspaper and charcoal briquettes for kindling. Another sheet of newspaper is placed within the housing below the grate and is ignited such that the charcoal briquettes are kindled quickly and effectively. After the charcoal briquettes have been kindled, a pronged handle is mounted onto the housing for turning the housing over to dump out the kindled charcoal into a grill or pit.

BRIEF DESCRIPTION OF THE DRAWINGS

The preferred embodiment of this invention will be described hereinafter, together with other features thereof, and additional objects will become evident from such description.

The invention will be more readily understood from a reading of the following specifications and by reference to the accompanying drawings forming a part thereof wherein an example of the invention is shown and wherein.

DESCRIPTION OF THE PREFERRED EMBODIMENT

Figure 1:
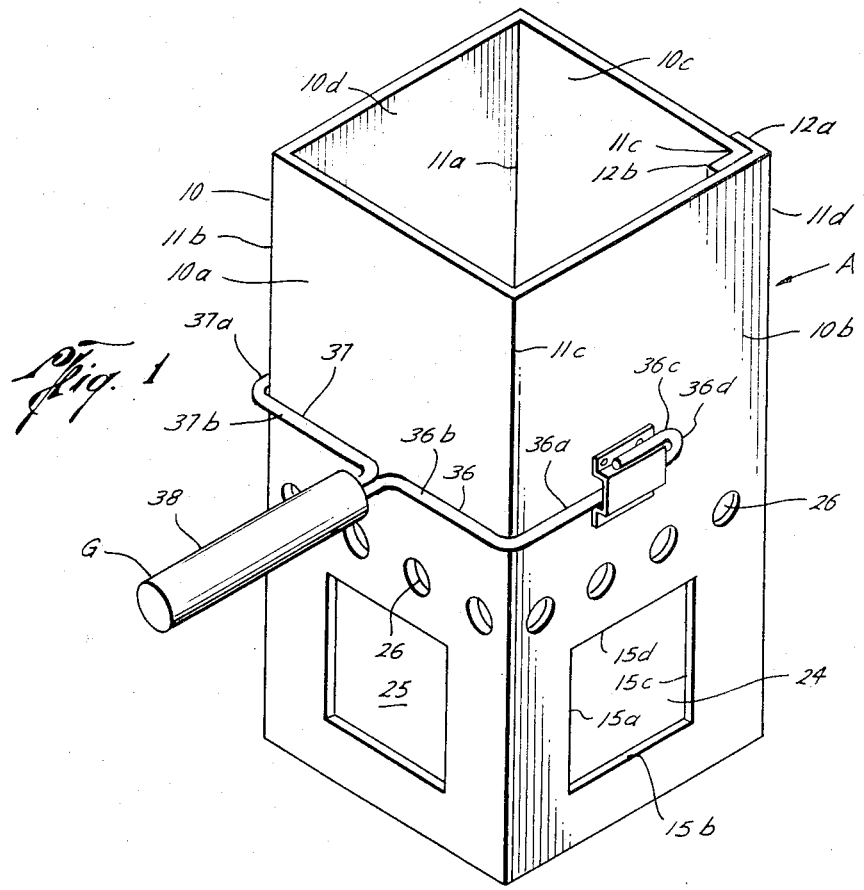
FIG. 1 is a perspective view of a kindling apparatus in a preferred embodiment.
Figure 3:
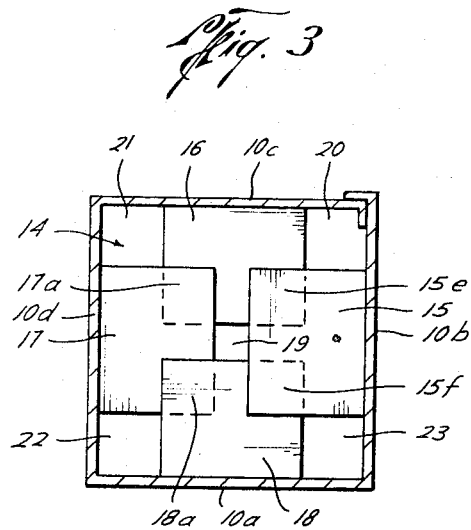
FIG. 3 is a sectional view taken along line 3—3 of FIG. 2 illustrating the grate of this invention.

In the drawing, an apparatus A is provided for kindling charcoal briquettes B in a safe and effective manner. The apparatus A includes a rectangular housing 10 which is formed by side walls 10a, 10b, 10c and 10d. In the preferred embodiment of this invention, the rectangular housing 10 is made from a single piece of metal which is bent to form corners 11a, 11b, 11c, 11d and 11e. The housing side walls 10b and 10c include wall portions 12a and 12b formed by the corners 11d and 11c, respectively. The wall portions 12a and 12b are positioned substantially adjacent each other and are connected together by any suitable means such as welding, metal screws or rivets thereby forming the rectangular housing 10.

Figure 2:
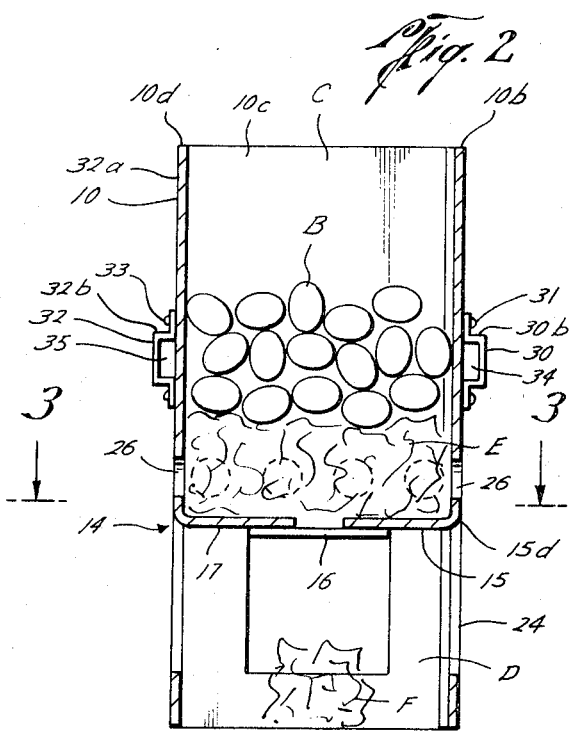
FIG. 2 is a sectional view in elevation of the kindling apparatus of this invention.

A grate designated generally as 14 is formed by grate sections 15, 16, 17 and 18 which are folded inwardly from the respective side walls 10b, 10c, 10d and 10a. The grate section 15 is formed by cutting into the side wall 10b along lines 15a, 15b and 15c to separate grate section 15 on three sides from the side wall 10b so that the grate section 15 may be bent inwardly along line 15d to the substantially horizontal position illustrated in FIG. 2.

In a similar manner, the grate sections 16, 17 and 18 are cut from the respective side walls 10c, 10d and 10a and are folded inwardly to form the grate 14. The grate 14 divides the rectangular housing 10 into an upper heating zone or chamber designated generally as C and a lower heating zone or chamber designated generally as D in which the kindling fire will be started. The charcoal briquettes B are placed in the upper heating zone C on top of a small number, such as four or five, half-sheets of newspaper E.

The grate sections, 15, 16, 17 and 18 overlap each other to provide a central opening or passageway 19 and corner openings of passageways 20, 21, 22 and 23. Actually, the grate section 16 is overlapped by portion 15e of the grate section 15 and by portion 17a of the grate section 17; and, the grate portion 18a overlaps grate section 17 and grate portion 15f overlaps the grate section 18. The overlapping feature of the grate sections 15, 16, 17 and 18 not only forms the openings such as central opening 19 therein but also provides a stronger base for supporting the charcoal briquettes B.

Each of the corner openings such as corner opening 20 is formed by the side walls 10b and 10c and by the grate sections 15 and 16. The center opening 19 is actually formed by the four grate sections 15, 16, 17 and 18 in their folded inward position. Similarly, the corner openings 21, 22 and 23 are formed by two connected side walls and the grate sections of those side walls.

Each of the grate sections such as the grate sections 15 and 18, when folded inwardly leave square openings 24 and 25, respectively in the lower heating zone D. Further, a plurality of holes 26 or drilled or placed by other suitable means in the side walls 10a, 10b, 10c and 10d slightly above the grate 14 to provide draft holes for the upper heating zone C.

In the operation or use of the apparatus A, a few half-sheets of newspaper E are crumpled and dropped on the grate 14 and the charcoal briquettes B are placed on top of the crumpled newspaper B. A single half-sheet of newspaper F is placed in the lower heating zone D and is ignited. The heat and flames from the ignited paper F in the lower heating zone D are transmitted upwardly into the upper heating zone C and ignite the newspaper E therein. The combination of the openings 19, 20, 21, 22 and 23 in the grate 14 with the square openings such as 24 and 25 in the lower heating zone D creates an excellent draft which assists in transmitting the heat caused from the burning paper F in the lower heating zone D to the upper heating zone C.

The flow of air through the square holes such as 24 and 25 into the lower heating zone D and through the openings 20, 21, 22 and 23 into the upper heating chamber C create a slightly lower pressure within the upper heating chamber C such that an excellent draft of air flows through the holes 26 in the upper heating chamber thereby supplying the burning newspaper E and the charcoal briquettes B with an ample oxygen supply. In this manner, the charcoal briquettes are heated until they become red hot in a rather short period of time and are ready to be dumped into a grill, brazier or barbecue pit of some type (not shown).

A bracket 30 is mounted onto outside surface 30a of the side wall 10b by any suitable means such as screws 31. And, a bracket 32 is mounted onto outside surface 32a by any suitable means such as screws 33. The bracket 30 cooperates with the outside surface 30a of side wall 10b to provide an opening 34 to receive a pronged handle G. Similarly, the bracket 32 cooperates with the outside surface 32a of side wall 10d to provide an opening 35 for receiving the pronged handle G.

The pronged handle G includes prong members 36 and 37 which are mounted in a cylindrically shaped handle 38 by any suitable means such as welding. The prong member 36 is shaped such that it includes a leg 36a which is bent at approximately a right angle with respect to prong leg 36b such that the prong legs 36a and 36b cooperate to conform to the right angle corner 11c formed by side walls 10a and 10b. In a similar manner, the prong member 37 includes legs 37a and 37b which are bent to a right angle with respect to each other to conform to the right angle corner 11b formed by side walls 10a and 10d of the rectangular housing 10.

The prong member 36 further includes an end portion 36c which is bent to form a U-shaped end 36d. The prong member 37 also has a U-shaped end (not shown) which is identical to the U-shaped end 36d of the prong member 36.

After the charcoal briquettes B have been kindled, the handle G is mounted in the brackets 30 and 32 by inserting the U-shaped end 36d of the prong member 36 into the opening 34 formed by the brackets 30. After the end 36d has been pushed all the way through the opening 34, the end 36d is pulled over top portion 30b of the bracket 30 such that the top portion 30b of the bracket 30 is disposed between the bent portion 36c and leg 36a of the U-shaped end 36. Similarly, a U-shaped end (not shown) for prong member 37, which is identical to the U-shaped end 36d, is mounted on the top portion 32b of the bracket 32 such that the handle G is secured to the rectangular housing 10 so that the apparatus A may be easily lifted and turned over for dumping the heated or kindled charcoal briquettes into a grill or pit.

The conforming of the prong members 36 and 37 to the sides 10a and 10b and 10a and 10d of the rectangular housing provide additional support for the handle G in that the legs 36b and 37b of the prongs 36 and 37 will engage the side wall 10a in the event that the handle G is moved upwardly or downwardly slightly with respect to the rectangular housing 10. In this manner the handle G is secured against the rectangular housing 10 and in engagement with the brackets 30 and 32 so that the rectangular housing, which after the coals have been kindled is very hot, may be handled safely with a minimum danger that the handle G will slip out of the brackets 30 and 32. Of course, after the coals are dumped out, the pronged handle G is removed from the brackets 30 and 32 so that the handle G will not get hot when the apparatus A is subsequently used to again kindle charcoal briquettes.

The foregoing disclosure and description of the invention are illustrative and explanatory thereof, and various changes in the size, shape, and materials as well as in the details of the illustrated construction may be made without departing from the spirit of the invention.

I claim:
1. Apparatus for kindling charcoal, comprising:
   a. side walls which are connected to form a substantially polygonal housing having an open top and bottom;
   b. a grate dividing said housing into an upper heating zone adapted to receive said charcoal and a lower heating zone adapted to accommodate a kindling fire; and
   c. said side walls including means for forming said grate including grate sections of said side walls folded and overlapped inwardly to provide support for said charcoal in said upper heating zone whereby said charcoal is positioned to receive heat from said lower heating zone.
2. The structure set forth in claim 1, including;
   a. said overlapping grate sections forming an opening at approximately the center of said grate for transmitting heat from said lower heating zone to said upper heating zone.
3. The structure set forth in claim 1, including:
   a. a first grate section of a first side wall of said housing extending inwardly; and
   b. a second grate section of a second side wall extending inwardly to cooperate with said first grate section and said first and second side walls to form an opening in said grate for transmitting heat from said lower heating zone to said upper heating zone.
4. The device set forth in claim 1 including;
   a. said side walls including opposing side walls which form a rectangular housing; and
   b. said grate sections from said opposing side walls being folded inwardly to form a grate having a center hole and a hole at each corner of said rectangu- lar housing for transmitting heat from said lower to said upper heating zone.

5. The structure set forth in claim 1 including;
a. a plurality of holes in said side walls of said housing positioned in said upper heating zone.

6. The structure set forth in claim 1, including:
a handle for manipulating said housing with kindled charcoal in said upper heating zone.

7. The structure set forth in claim 1, including:
a. brackets mounted on said side walls; and
b. a removable handle including prong members which removably engage said brackets whereby said housing is movable even with kindled charcoal therein.

8. The structure set forth in claim 7 in which said removable handle includes:
said prong members having U-shaped ends for slidably mounting said handle with said brackets.

9. The structure set forth in claim 7 in which said removable handle includes:
a. said prong members have portions which substantially conform to the configuration of said polygonal housing; and
b. said prong members include U-shaped ends for slidable mounting in said brackets whereby said handle is mounted on said housing to lift and turn over said housing so that kindled charcoal is removed therefrom.

* * * * *